US006461425B2

(12) United States Patent
Brown et al.

(10) Patent No.: US 6,461,425 B2
(45) Date of Patent: *Oct. 8, 2002

(54) CEMENTITIOUS DRY CAST MIXTURE

(75) Inventors: Heath Brown, Akron, OH (US);
Jeffrey R. Bury, Macedonia, OH (US);
Lan Huang, Twinsburg, OH (US);
Runhai Lu, Stow, OH (US); Jesse Osborne, Garfield Heights, OH (US);
Ken Sroka, Parma, OH (US); Thomas M. Vickers, Jr., Concord Township, OH (US)

(73) Assignee: MBT Holding AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/847,693

(22) Filed: May 2, 2001

(65) Prior Publication Data

US 2001/0023654 A1 Sep. 27, 2001

Related U.S. Application Data

(63) Continuation of application No. 09/369,562, filed on Aug. 6, 1999.
(60) Provisional application No. 60/133,104, filed on May 7, 1999, and provisional application No. 60/096,500, filed on Aug. 14, 1998.

(51) Int. Cl.$^7$ ............................................. C04B 24/12
(52) U.S. Cl. ..................... 106/727; 106/728; 106/823; 524/5
(58) Field of Search ................. 106/727, 728, 106/823; 524/5

(56) References Cited

U.S. PATENT DOCUMENTS

| | | |
|---|---|---|
| 2,790,724 A | 4/1957 | Bergman |
| 3,947,171 A | 3/1976 | Yasuda et al. |
| 4,090,946 A | 5/1978 | Nottes et al. |
| 4,093,690 A | 6/1978 | Murray |
| 4,247,516 A | 1/1981 | Morgan |
| 4,318,744 A | 3/1982 | Dodson |
| 4,337,094 A | 6/1982 | Tokar |
| 4,373,956 A | 2/1983 | Rosskopf |
| 4,460,720 A | 7/1984 | Gaidis et al. |
| 4,471,100 A | 9/1984 | Tsubakimoto et al. |
| 4,519,842 A | 5/1985 | Gerber |
| 4,581,147 A | 4/1986 | Branch, III |
| 4,650,522 A | 3/1987 | Teraji et al. |
| 4,655,942 A | 4/1987 | Dickert, Jr. et al. |
| 4,681,634 A | 7/1987 | Roca et al. |
| 4,686,252 A | 8/1987 | Burge |
| 4,703,087 A | 10/1987 | Lange et al. |
| 4,725,632 A | 2/1988 | Vess |
| 4,741,777 A | 5/1988 | Williams |
| 4,761,183 A | 8/1988 | Clarke |
| 4,777,208 A | 10/1988 | Hefner, Jr. et al. |
| 4,792,343 A | 12/1988 | Hawe et al. |
| 4,797,450 A | 1/1989 | Dehm et al. |
| 4,808,641 A | 2/1989 | Yagi et al. |
| 4,897,119 A | 1/1990 | Clarke |
| 4,946,506 A | 8/1990 | Arfaei |

(List continued on next page.)

FOREIGN PATENT DOCUMENTS

| | | |
|---|---|---|
| EP | 537870 A1 | 4/1993 |
| EP | 725044 A1 | 8/1996 |
| EP | 753488 A2 | 1/1997 |
| EP | 838444 A1 | 4/1998 |
| EP | 850894 A1 | 7/1998 |
| EP | 0930321 A1 | 1/1999 |
| WO | WO 97/08217 | 3/1997 |
| WO | WO 97/39037 | 10/1997 |
| WO | 98/51640 | 11/1998 |

OTHER PUBLICATIONS

Japio Publication No. 08–119701 English language abstract for JP 8119701 A—published May 14, 1996.
Japio Publication No. 08–012398 English language abstract for JP 8012398 A—published Jan. 16, 1996.
Japio Publication No. 09–278505 English language abstract for JP 9278505 A—published Oct. 28, 1997.
Japio Publication No. 09–241055 English language abstract for JP 9241055 A—published Sep. 16, 1997.
Japio Publication No. 09–142906 English language abstract for JP 9142906 A—published Jun. 3, 1997.
Japio Publication No. 09–142905 English language abstract for JP 9142905 A—published Jun. 3, 1997.
Japio Publication No. 09–132446 English language abstract for JP 9132446 A —published May 20, 1997.
Japio Publication No. 09–132445 English language abstract for JP 9132445 A—published May 20, 1997.

(List continued on next page.)

*Primary Examiner*—Paul Marcantoni
(74) *Attorney, Agent, or Firm*—Renner, Kenner, Greive, Bobak, Taylor & Weber

(57) ABSTRACT

The present invention is directed to cementitious dry cast mixtures for forming cementitious articles, particularly a cementitious dry cast mixture containing a dispersant, wherein said dispersant is a derivatized polycarboxylate dispersant which is a polymer comprising units derived from at least a substituted carboxylic acid monomer or substituted ethylenically unsaturated monomer, and optionally including at least one of an unsaturated hydrocarbon, an N-polyoxyalkylene maleimide, and a condensation product of an unsubstituted carboxylic acid monomer and an alkoxypolyoxyalkylene primary amine substituted carboxylic acid monomer. The cementitious dry cast mixture has a reduced effective dose of dispersant; compacts and consolidates in response to vibration energy; reduces the cycle time in the production of articles manufactured from dry cast mixtures; provides for increased green strength, density, and early compressive strength; and improves the surface aesthetics of articles manufactured from dry cast mixtures. Additionally, a surface active agent/air entraining agent can be included in combination with the dispersant to provide for increased swipe effect.

28 Claims, No Drawings

U.S. PATENT DOCUMENTS

| | | | |
|---|---|---|---|
| 4,968,734 | A | 11/1990 | Gaidis et al. |
| 4,972,025 | A | 11/1990 | Tsubakimoto et al. |
| 5,085,709 | A | 2/1992 | Moriva et al. |
| 5,100,984 | A | 3/1992 | Burge et al. |
| 5,106,423 | A | 4/1992 | Clarke |
| 5,134,187 | A | 7/1992 | Aihara |
| 5,158,996 | A | 10/1992 | Valenti |
| 5,211,751 | A | 5/1993 | Arfaei |
| 5,223,036 | A | 6/1993 | Kovata et al. |
| 5,250,113 | A | 10/1993 | Berke et al. |
| 5,348,583 | A | 9/1994 | Arfaei |
| 5,348,993 | A | 9/1994 | Daeumer et al. |
| 5,358,566 | A | 10/1994 | Tanaka et al. |
| 5,369,198 | A | 11/1994 | Albrecht et al. |
| 5,393,343 | A | 2/1995 | Darwin et al. |
| 5,424,445 | A | 6/1995 | Hendrick ter Maat et al. |
| 5,478,521 | A | 12/1995 | Scheiner |
| RE35,194 | E | 4/1996 | Gerber |
| 5,556,458 | A | 9/1996 | Brook |
| 5,576,378 | A | 11/1996 | Kuhlmann et al. |
| 5,583,183 | A | 12/1996 | Darwin et al. |
| 5,604,273 | A | 2/1997 | Kerkar et al. |
| 5,605,571 | A | 2/1997 | Buerge |
| 5,609,681 | A | 3/1997 | Drs et al. |
| 5,612,396 | A | 3/1997 | Valenti et al. |
| 5,614,017 | A | 3/1997 | Shawl |
| 5,633,298 | A | 5/1997 | Arfaei et al. |
| 5,633,310 | A | 5/1997 | Sulser et al. |
| 5,643,978 | A | 7/1997 | Darwin et al. |
| 5,661,206 | A | 8/1997 | Tanaka et al. |
| 5,665,158 | A | 9/1997 | Darwin et al. |
| 5,665,842 | A | 9/1997 | Leikauf |
| 5,668,195 | A | 9/1997 | Leikauf |
| 5,670,578 | A | 9/1997 | Shawl |
| 5,674,316 | A | 10/1997 | Izumi et al. |
| 5,703,174 | A | 12/1997 | Arfaei et al. |
| 5,707,445 | A | 1/1998 | Yamato et al. |
| 5,725,657 | A * | 3/1998 | Darwin et al. ............... 106/808 |
| 5,726,267 | A | 3/1998 | Howland et al. |
| 5,728,207 | A | 3/1998 | Arfaei et al. |
| 5,739,212 | A | 4/1998 | Wutz et al. |
| 5,753,744 | A | 5/1998 | Darwin et al. |
| 5,786,436 | A | 7/1998 | Fischer et al. |
| 5,798,425 | A | 8/1998 | Albrecht et al. |
| 5,840,114 | A | 11/1998 | Jeknavorian et al. |
| 5,912,284 | A | 6/1999 | Hirata et al. |
| 5,925,184 | A | 7/1999 | Hirata et al. |
| 6,008,275 | A | 12/1999 | Moreau et al. |

OTHER PUBLICATIONS

Japio Publication No. 09–110492 English language abstract for JP 9110492 A—published Apr. 28, 1997.
Japio Publication No. 09–067153 English language abstract for JP 9067153 A—published Mar. 11, 1997.
Japio Publication No. 09–012351 English language abstract for JP 9012351 A—published Jan. 14, 1997.
Japio Publication No. 08–295547 English language abstract for JP 8295547 A—published Nov. 12, 1996.
Japio Publication No. 08–268741 English language abstract for JP 8268741 A—published Oct. 15, 1996.
Japio Publication No. 08–165156 English language abstract for JP 8165156 A—published Jun. 25, 1996.
Japio Publication No. 08–059323 English language abstract for JP 8059323 A—published Mar. 5, 1996.
Japio Publication No. 08–048852 English language abstract for JP 8048852 A—published Feb. 20, 1996.
Japio Publication No. 08–034652 English language abstract for JP 8034652–A—published Feb. 6, 1996.
Japio Publication No. 08–012401 English language abstract for JP 8012401 A—published Jan. 16, 1996.
Japio Publication No. 07–247150 English language abstract for JP 7247150 A—published Sep. 26, 1995.
Japio Publication No. 07–247149 English language abstract for JP 7247149 A—published Sep. 26, 1995.
JPIO Publication No. 07–247148 English language abstract for JP 7247148 A—published Sep. 26, 1995
Japio Publication No. 07–126053 English language abstract for JP 7126053 A—pubished May 16, 1995.
Japio Publication No. 07–053249 English language abstract for JP 7053249 A—published Feb. 28, 1995.
Japio Publication No. 07–025651 English language abstract for JP 7025651 A—published Jan. 27, 1995.
Japio Publication No. 07–025650 English language abstract for JP 7025650 A—published Jan. 27, 1995.
Japio Publication No. 06–321596 English language abstract for JP 6321596 A—published Nov. 22, 1994.
Japio Publication No. 06–298557 English language abstract for JP 6298557 A—published Oct. 25, 1994.
Japio Publication No. 06–279082 English language abstract for JP 6279082 A—published Oct. 4, 1994.
Japio Publication No. 06–256054 English language abstract for JP 6256054 A—published Sep. 13, 1994.
Japio Publication No. 06–183803 English language abstract for JP 6183803 A—published Jul. 5, 1994.
Japio Publication No. 06–157100 English language abstract for JP 6157100 A—published Jun. 3, 1994.
Japio Publication No. 06–107446 English language abstract for JP 6107446 A—published Apr. 19, 1994.
Japio Publication No. 06–064956 English language abstract for JP 6064956 A—pubished Mar. 8, 1994.
Japio Publication No. 05–246743 English language abstract for JP 5246743 A—pubished Sep. 24, 1993.
Japio Publication No. 05–170501 English language abstract for JP 5170501 A—published Jul. 9, 1993.
Japio Publication No. 04–175254 English language abstract for JP 4175154 A—pubished Jun. 23, 1992.
Japio Publication No. 04–175253 English language abstract for JP 4175253 A—published Jun. 23, 1992.
Japio Publication No. 04–119956 English language abstract for JP 4119956 A—published Apr. 21, 1992.
Japio Publication No. 04–119955 English language abstract for JP 4119955 A—published Apr. 21, 1992.
Japio Publication No. 03–218956 English language abstract for JP 3218956 A—published Sep. 26, 1991.
Japio Publication No. 02–281014 English language abstract for JP 2281014 A—published Nov. 16, 1990.
Japio Publication No. 01–188449 English language abstract for JP 1188449 A—published Jul. 27, 1989.
Japio Publication No. 63–285142 English language abstract for JP 63285142 A—published Nov. 22, 1988.
Patent Abstract of Japan Publication No. 07267705 Applicant: Fujisawa Pharmaceut Co. Ltd., Publication Date: Oct. 17, 1995.

* cited by examiner

CEMENTITIOUS DRY CAST MIXTURE

CROSS REFERENCE TO RELATED APPLICATIONS

This application is a Continuation of U.S. Ser. No 09/369,562 filed Aug. 6, 1999, which claims priority from U.S. Provisional Patent Application No. 60/096,500, filed Aug. 14, 1998, and U.S. Provisional Patent Application No. 60/133,104, filed May 7, 1999.

FIELD OF THE INVENTION

The present invention is directed to cementitious dry cast mixtures, such as those for which vibration is used to consolidate and compact the dry cast mixture in a mold or extruder. Specifically, the invention is directed to the use of derivatized polycarboxylate additives that function at least in part as dispersants in cementitious dry cast mixtures to allow for reduced water usage, consolidation and compaction of the dry cast mixture, providing for increased compressive strength and reduced cycle time of dry cast formation. The invention is further directed to the use of derivatized polycarboxylate polymer dispersants in combination with surface active agents/air entraining agents to provide increased swipe and early compressive strength.

BACKGROUND OF THE INVENTION

A cementitious dry cast mixture refers to pastes, mortars, and concrete compositions comprising a hydraulic cement binder having consistencies ranging from stiff to extremely dry as defined in ACI 211.3R, Table 2.3.1. Pastes are defined as mixtures composed of a hydraulic cement binder, either alone or in combination with pozzolans such as fly ash, silica fume, or blast furnace slag, and water. Mortars are defined as pastes that additionally include fine aggregate. Concretes additionally include coarse aggregate. These compositions may additionally include other admixtures such as set retarders, set accelerators, defoaming agents, air-entraining or air detraining agents, corrosion inhibitors, water reducing agents, pigments, and any other admixture that does not adversely affect the advantageous results obtained by the admixtures of the present invention.

Cementitious dry cast mixtures are used to form many articles, for example, concrete pipe, roof tile, masonry units, paver units, extruded plank, and any other preformed cementitious articles, in a mold or from an extrusion die. Each of these applications has basic desired characteristics that are critical in terms of producing quality finished units.

In masonry block applications, production speed, sufficient green strength, and the ability to resist slumping, sagging or deforming when stripped from the mold is critical since stripping occurs immediately after casting. The same is true for concrete pipe or roof tile with the additional desired property of improved surface appearance with reduced surface imperfections and reduced roller and/or die wear on equipment producing extruded pieces.

It is desired to reduce the cycle time of the manufacture of each article. The reduction of cycle time reduces the cost of manufacture for each article and increases the number of articles that can be produced in a given time. Cycle time is defined as the time to complete one full cycle from the beginning of feed to the end, or next beginning of feed. The beginning of feed is when the dry cast mixture is fed from a collection hopper into the process. It is also desired to improve the compaction and consolidation of the cementitious dry cast mixture without altering the consistency of the mixture.

Green strength refers to the stability of the article in retaining its shape once the article is removed from the mold or extruder. Green strength is dependent on the consistency of the cementitious dry cast mixture, the amount of fines in the cementitious dry cast mixture, and the moldability of the cementitious dry cast mixture.

Currently, the water to cement (W/C) ratio used in present dry cast mixtures is from about 0.25 to about 0.60. It is desired to minimize the amount of water needed in a cementitious dry cast mixture to achieve consolidation and no sag or deformation in an article produced from the cementitious dry cast mixture.

Another property of cementitious dry cast mixtures for certain dry cast industries is swipe. Swipe is defined as surface effect on a cast article when the mold is removed. Swipe is measured by visually evaluating the surface of the finished article. Swipe is ranked from no swipe to heavy swipe. It is desired to achieve a selected amount of swipe for a finished article.

A further limitation in the present art is the compressive strength of articles produced from cementitious dry cast mixtures. Early compressive strength is defined as the compressive strength achieved within 24 hours with or without steam cure. Compressive strength is determined by ASTM C-1176-2.

Another limiting factor in the improvement of dry cast mixtures is the type and amount of dispersant used. Conventional dispersant chemistries such as naphthalene sulfonates, melamine sulfonates, and lignosulfonates have a lower limit to their effective dosage; below which they are not effective. At levels above the effective dosage of these dispersants, the dry cast mixture becomes critically sensitive to very slight changes in water or moisture content. This makes the use of these dispersants impractical.

The art lacks a cementitious dry cast mixture containing a dispersant that has a low effective dosage, that is not critically sensitive to changes in water or moisture content, that functions in mixtures having a slump of less than about one (1) inch, that permits mixture consolidation and compaction in response to vibration energy, that has increased green strength and compressive strength, and that provides for reduced cycle time in the manufacture of articles from dry cast mixtures. The art also lacks a cementitious dry cast mixture containing a combination of a derivatized polycarboxylate dispersant with a surface active agent/air entraining agent to provide for increased swipe and increased early compressive strength.

It is an object of the invention to provide a combination of a derivatized polycarboxylate dispersant with a surface active agent/air entraining agent to increase the swipe and early compressive strength of a cementitious dry cast mixture.

It is another object of the invention to lower the effective dose of dispersant required to consolidate a cementitious dry cast mixture into the range of from about 0.005 to about 0.12% by weight of cement.

It is another object of the invention to provide a cementitious dry cast mixture article that has increased green strength and increased compressive strength.

SUMMARY OF THE INVENTION

The present invention is directed to cementitious dry cast mixtures for forming cementitious articles. In particular, the invention is directed to a cementitious dry cast mixture comprising cement, water, coarse aggregate, fine aggregate, and including a dispersant, wherein said dispersant is a derivatized polycarboxylate dispersant, or combination of polycarboxylate dispersants, which is a polymer comprising units derived from at least a substituted carboxylic acid monomer or substituted ethylenically unsaturated monomer, and optionally including at least one of an unsaturated hydrocarbon, an N-polyoxyalkylene maleimide, and a condensation product of an unsubstituted carboxylic acid monomer and an alkoxypolyoxyalkylene primary amine substituted carboxylic acid monomer.

The present invention is also directed to a method for making a dry cast cementitious article comprising providing a mixture of hydraulic cement, water, coarse aggregate, fine aggregate, and including a dispersant, wherein said dispersant is a derivatized polycarboxylate dispersant which is a polymer comprising units derived from at least a substituted carboxylic acid monomer or substituted ethylenically unsaturated monomer, and optionally including at least one of an unsaturated hydrocarbon, an N-polyoxyalkylene maleimide, and a condensation product of an unsubstituted carboxylic acid monomer and an alkoxypolyoxyalkylene primary amine substituted carboxylic acid monomer; and forming the article from the mixture.

The present invention is also directed to cementitious dry cast mixtures for forming cementitious articles. In particular, the invention is directed to a cementitious dry cast mixture comprising cement, water, coarse aggregate, fine aggregate, surface active agent/air entraining agent, and including a dispersant, wherein said dispersant is a derivatized polycarboxylate dispersant, or combination of polycarboxylate dispersants, which is a polymer comprising units derived from at least a substituted carboxylic acid monomer or substituted ethylenically unsaturated monomer, and optionally including at least one of an unsaturated hydrocarbon, an N-polyoxyalkylene maleimide, and a condensation product of an unsubstituted carboxylic acid monomer and an alkoxypolyoxyalkylene primary amine substituted carboxylic acid monomer.

The present invention is also directed to a method for making a dry cast cementitious article comprising providing a mixture of hydraulic cement, water, coarse aggregate, fine aggregate, a surface active agent/air entraining agent, and including a dispersant, wherein said dispersant is a derivatized polycarboxylate dispersant which is a polymer comprising units derived from at least a substituted carboxylic acid monomer or substituted ethylenically unsaturated monomer, and optionally including at least one of an unsaturated hydrocarbon, an N-polyoxyalkylene maleimide, and a condensation product of an unsubstituted carboxylic acid monomer and an alkoxypolyoxyalkylene primary amine substituted carboxylic acid monomer; and forming the article from the mixture.

DETAILED DESCRIPTION OF THE INVENTION

The present invention concerns the use of low levels of derivatized polycarboxylate dispersants to improve the consolidation of cementitious dry cast mixtures. A derivatized polycarboxylate dispersant is defined as a polymer comprising units derived from at least a substituted carboxylic acid monomer or substituted ethylenically unsaturated monomer, and optionally including at least one of an unsaturated hydrocarbon, an N-polyoxyalkylene maleimide, and a condensation product of an unsubstituted carboxylic acid monomer and an alkoxypolyoxyalkylene primary amine substituted carboxylic acid monomer. The dispersant preferably has the general structure shown below:

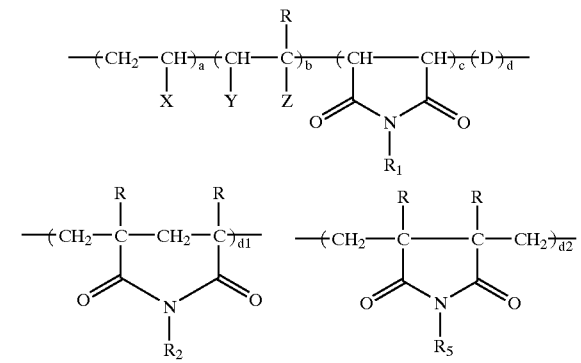

where:

D=a component selected from the group consisting of the structure d1, the structure d2, and mixtures thereof;

X=H, $CH_3$, $C_2$ to $C_6$ Alkyl, Phenyl, Substituted Phenyl such as p-Methyl Phenyl, Sulfonated Phenyl;

Y=H, —COOM;

R=H, $CH_3$;

Z =H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;

$R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, about $C_6$ to about $C_{10}$ aryl;

M=H, Alkali Metal, Alkaline Earth Metal, Ammonia, Amine, Substituted Amine such as triethanol amine, Methyl, $C_2$ to about $C_6$ Alkyl;

a=0 to about 0.8, preferably 0 to about 0.6, and most preferably 0 to about 0.5;

b=about 0.2 to about 1.0, preferably about 0.3 to about 1.0, and most preferably about 0.4 to about 1.0;

c=0 to about 0.5, preferably 0 to about 0.3, and most preferably 0 to about 0.1;

d=0 to about 0.5, preferably 0 to about 0.3, and most preferably 0 to about 0.1; and wherein a, b, c, and d represent the mole fraction of each unit and the sum of a, b, c, and d is 1.0.

Representative monomers for use in this invention for the "a" component include, but are not limited to, styrene, ethylene, propylene, or sulfonated styrene. Representative monomers for use in this invention for the "b" component include, but are not limited to, acrylic acid, methacrylic acid, alkyl esters of acrylic acid, alkyl esters of methacrylic acid, alkoxypolyoxyalkylene esters of acrylic acid, aryloxypolyoxyalklyene esters of acrylic acid, alkoxypolyoxyalkylene esters of methacrylic acid, aryloxypolyoxyalkylene esters of methacrylic acid, maleic acid, vinyl sulfonic acid, methoxypolyoxyalkylene vinyl ether, methoxypolyoxyalkylene allyl ether, alkoxypolyoxyalkylene vinyl ether, aryloxypolyoxyalkylene vinyl ether, alkoxypolyoxyalkylene allyl ether, or aryloxypoloxyalkylene allyl ether.

Components "c" and "d" can be formed from a post reaction from the grafting of the side chains onto the polymer backbone such as a polyacrylate maleic anhydride copolymer. The reaction to form component "c" and/or "d" is related to the temperature of the grafting reaction. If the temperature is high enough, the imide components "c" and "d" are formed. Component "c" is formed from a single monomer which is a component "b" with Y as COOH and Z as $CONHR_3$. A condensation reaction occurs wherein water condenses and the ring closes to form component "c".

Component "d" is formed by a condensation of two monomers such as acrylic acid (component "b" with Y as COOH and Z as H) and an acrylic acid derivatized with an alkoxypolyoxyalkyne primary amine, that is a component "b" with Y as H and Z as $CONHR_3$. A condensation reaction occurs wherein water condenses and the ring closes to form component "d1" or "d2". Component "d2" is formed by a head to head reaction of the two monomers. Component "d1" is formed by a head to tail reaction of the two monomers.

In one preferred embodiment, components "a" and "b" are present and "c" and "d" are absent in the polymer of the derivatized polycarboxylate dispersant.

The alkali metal in the present invention is preferably lithium, sodium, or potassium. The alkaline earth metal in the present invention is preferably magnesium or calcium.

While polycarboxylate dispersants in general are known in the industry to be highly effective and efficient at producing highly flowable concrete, the derivatized polycarboxylate dispersants of the present invention may be advantageously used at low to extremely low levels, 0.005 to 0.12% by weight of cement, to improve the paste phase response to vibration or other energy applied to the cementitious dry cast mixture during consolidation. Consolidation and compaction of the dry cast mixture results in increased compressive strengths, higher density, lower water absorption or permeability, and better surface appearance of the finished unit (reduced imperfections and holes). Additionally, the reduced levels of dispersants result in a reduced cost for materials for the cementitious dry cast mixture.

Cementitious dry cast mixtures of the present invention generally comprise hydraulic cement, the dispersant, fine aggregate, coarse aggregate, and optionally silica fume, pozzolans such as fly ash or calcined clay, and pigments. Water is added to form the cementitious mixture into a paste.

The hydraulic cement can be a portland cement, a magnesium phosphate cement, a magnesium potassium phosphate cement, or any other suitable hydraulic binder. The coarse aggregate can be silica, quartz, crushed round marble, glass spheres, granite, limestone, calcite, feldspar, alluvial sands, any other durable aggregate, and mixtures thereof. The fine aggregate can be sand, any other suitable aggregate, and mixtures thereof.

Cementitious dry cast mixtures have been found to respond to vibration or applied energy when the mixture is properly proportioned. The derivatized polycarboxylate dispersants improve the mobility of the paste when under stress from vibration or energy. When the mold is subjected to vibration or other energy, the paste fraction of the mixture functions as the vehicle/lubricant by which the solid aggregate particles move and orient themselves during consolidation.

The derivatized polycarboxylate dispersants of the present invention allow for reduced water content, minimize the effect of the variation in size of the aggregate particles, and allow the incorporation of additional fines such as fumed silica in the mixture. All of these factors in turn improve the green strength of the articles formed from cementitious dry cast mixtures.

The reduced water content provides cementitious dry cast mixtures with stiff to extremely dry consistencies, with typical W/C ratios at or below 0.36, preferably at or below 0.30. Without being limited by theory, it is theorized that the reduced water content allows the cementitious dry cast mixture to hydrate and set faster which increases the green strength of an article formed from the cementitious dry cast mixture. This is also thought to result in reduced sagging and deformation when the article is removed from a mold or is extruded from a die. Additionally, the cementitious dry cast mixtures of the present invention have the appearance of dry to almost dry.

The derivatized polycarboxylate dispersants of the present invention minimize the effect of the variation in size of the aggregate particles by improving the lubricity of the thin paste layer covering the aggregate allowing improved movement during consolidation. This effect is typically obtained by increasing the cement content, the water content, or both. Minimizing water content and maximizing cement efficiency in turn increases the green strength of an article formed from the cementitious dry cast mixture.

Addition of silica fume increases the cohesiveness of the cementitious dry cast mixture which then increases the green strength of an article formed from the cementitious dry cast mixture. Silica fume used in the present invention can be uncompacted or can be partially compacted. Silica fume additionally reacts with the hydration byproducts of the cement binder which provides for increased strength of the finished articles and decreases the permeability of the finished articles. The silica fume, or other pozzolans such as fly ash or calcined clay such as metakaolin, can be added to the cementitious dry cast mixture in an amount from about 5% to about 30% based on the weight of cement.

By allowing for a reduced W/C ratio, improved paste lubricity and increased green strength, the cycle time of producing an individual article from a cementitious dry cast mixture is reduced. Compared to dry cast mixtures of the prior art, cycle time reductions are improved by 50 to 100%. By allowing articles to be removed from the molds in a shorter period of time or by increasing the rate of extrusion, the cycle time for producing each article is reduced. Additionally, more articles can now be produced in the same equipment. These factors combine to reduce the cost of manufacture of each article, such as masonry blocks.

Additionally, the additive dosage of the derivatized polycarboxylate dispersant of the present invention can be slightly increased (but still in the range of 0.005 to 0.12% by cement weight) in combination with a reduction of the W/C ratio to provide further improvements without changing the dry consistency of the mixture. As the dispersant level is increased, the W/C ratio can be decreased. The W/C ratio and dispersant level can be varied to optimize the production of each type of dry cast article from a cementitious dry cast mixture.

For masonry block, the compacted density and compressive strength of dry cast concrete mixtures have been shown to be increased over a plain reference at the same W/C ratio by using a derivatized polycarboxylate additive at about 0.01 to about 0.03% by weight of cement. The compaction speed, consolidation and resulting compressive strength of masonry block has been shown to be improved by using a derivatized polycarboxylate additive, most preferably at about 0.03% by weight of cement. The compressive strength of a dry cast mixture of the present invention is increased by up to 30%. The basic desired characteristics of the dry cast mixture for masonry block, which are sharp corners, sharp edges, no web cracking, no sagging or deformation, are not negatively affected by these improvements.

For pipe and roof tile, the increased density and compaction of the cementitious dry cast mixture additionally results in reduced imperfections in an article produced from the cementitious dry cast mixture. Typically, a cementitious dry cast mixture has air pockets that are retained in the mixture after the mixture has set. On the surface of an article, these holes are called bugholes and they detract from the aesthetic value of the article. Other imperfections referred to as honeycombs, which are zones of poorly compacted mixture, decrease the compressive strength of the article and increase the permeability of the article. The increased density and compaction, according to the invention, reduce or eliminate these problems. Additionally, other surface defects are eliminated by the vibratory consolidation of the cementitious dry cast mixtures of the present invention.

The derivatized polycarboxylate additive can be combined with other chemical or mineral additives typically used in the various applications such as set accelerators, set retarders, defoaming agents, air-entraining or air detraining agents, water repellant agents, water reducing agents, and any other conventional additives for cementitious mixtures. The basic properties of a cementitious dry cast mixture are not negatively affected by the use of the derivatized polycarboxylate dispersants of the present invention.

The polymers used in the derivatized polycarboxylate dispersant of the present invention can be made by methods known in the art, such as those referenced in U.S. Pat. No. 5,661,206 to Tanaka et al., U.S. Pat. No. 5,393,343 to Darwin et al., U.S. Pat. No. 5,158,996 to Valenti, U.S. Pat. No. 5,047,087 to Montague et al., U.S. Pat. No. 4,972,025 to Tsubakimoto et al., U.S. Pat. No. 4,968,734 to Gaidis et al., U.S. Pat. No. 4,473,406 to Bradley et al., and U.S. Pat. No. 4,471,100 to Tsubakimoto et al. all of which are hereby incorporated by reference herein as if fully written out below.

Another embodiment of the invention provides for a method for making a dry cast cementitious article. The method comprises providing a mixture of hydraulic cement, water, coarse aggregate, fine aggregate, and the above derivatized polycarboxylate dispersant, then forming the article from the mixture. Forming can be any method including placing the mixture in a mold and vibrating the mold or extruding the mixture through a die.

In another embodiment, the present invention provides for a combination of the above derivatized polycarboxylate dispersant with a surface active agent/air entraining agent. The combination provides for increased swipe and increased early strength.

The surface active agent/air entraining agent of the present invention can be any known surface active agents/air entraining agents for cement including anionic, cationic, nonionic surfactants, natural resin, synthetic resin, natural rosin, synthetic rosin, any inorganic air entraining agent, and mixtures thereof.

Illustrative examples of surface active agent/air entraining agents that can be used with the present invention include, but are not limited to, alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, silicon containing surfactants, olefin sulfonates, olefin sulfates, and mixtures thereof. A preferred foaming agent is ethoxylated nonylphenol.

The foaming agent is added in an amount from about 0.001% to about 0.4% based on the weight of cement, preferably about 0.005% to about 0.012%.

Alkanolamide foaming agents according to the present invention include, but are not limited to, those having from about 12 to about 20 carbon atoms Alkanolamine foaming agents according to the present invention include, but are not limited to, those having from about 12 to about 20 carbon atoms.

Alkylaryl sulfonate foaming agents according to the present invention include, but are not limited to, those having one aryl group and having alkyl groups with about 12 to about 20 carbon atoms.

Polyethylene oxide-polypropylene oxide block copolymer foaming agents according to the present invention include, but are not limited to, those having about 4 to about 50 units of each block.

Alkylphenol ethoxylate foaming agents according to the present invention include, but are not limited to, those having an alkyl group of about 4 to about 50 carbon atoms.

Carboxylates of fatty acid foaming agents according to the present invention include, but are not limited to, those in which the fatty acid moiety has about 6 to about 20 carbon atoms.

Ethoxylates of fatty acid foaming agents according to the present invention include, but are not limited to, those in which the number of ethoxylate groups is about 4 to about 20 and the fatty acid moiety has about 6 to 20 carbon atoms.

Sulfonates of fatty acid foaming agents according to the present invention include, but are not limited to, those in which the fatty acid moiety has about 6 to about 20 carbon atoms.

Sulfates of fatty acid foaming agents according to the present invention include, but are not limited to, those in which the fatty acid moiety has about 6 to about 20 carbon atoms.

Fluorocarbon containing surfactant foaming agents according to the present invention include, but are not limited to, those having about 6 to about 20 carbon atoms and one or more $CH_2$ moieties are replaced by $CF_2$ moieties.

Olefin sulfonate foaming agents according to the present invention include, but are not limited to, those having about 12 to about 20 carbon atoms.

Olefin sulfate foaming agents according to the present invention include, but are not limited to, those having about 12 to about 20 carbon atoms.

Representative examples of surfactant that can be used as the surface active agent/air entraining agent include ethoxylated nonylphenol, alpha olefin sulfonate, or cocamide DEA.

The derivatized polycarboxylate dispersant to surface active agent/air entraining agent ratio is from about 10:1 to about 1:10 by weight. Preferably, the ratio of the derivatized polycarboxylate dispersant to the surface active agent/air entraining agent is from about 6:4 to about 4:6 by weight.

Another embodiment of the invention provides for a method for making a dry cast cementitious article. The method comprises providing a mixture of hydraulic cement, water, coarse aggregate, fine aggregate, surface active agent/air entraining agent, and the above derivatized polycarboxylate dispersant, then forming the article from the mixture. Forming can be any method including placing the mixture in a mold and vibrating the mold or extruding the mixture through a die.

Specific Embodiments of the Invention

The invention is illustrated by, but not limited to, the following examples.

EXAMPLE 1

An additive based on a derivatized polycarboxylate dispersant was evaluated in a dry cast concrete pipe mixture to determine the effects of the additive on specimen consolidation. A low dose of 0.033% by weight of cement was compared to a plain reference mixture at the same W/C ratio and a higher dose of 0.067% by weight of cement was compared using a slightly reduced W/C ratio. Mixtures were prepared using two different aggregates; a rounded ⅜" pea gravel and an angular ½" limestone. Mixture proportions (Table 1) were based on those of a concrete pipe mix used in the field. All of the prepared mixtures were judged to be similar, extremely dry consistencies, i.e., just able to be "balled" when squeezed by hand. Specimens for weight measurements were prepared using 4" steel cube molds (1049 cc) consolidated with a vibrating table (FMC Syntron Vibrating Table, Model VB5101) set at a fixed frequency and amplitude for all specimens. A pair of cubes were prepared for each mix condition by filling the mold to excess, vibrating for either 20, 60, or 120 seconds, then cutting off the top of the specimen flush with the top of the mold. At one day, the specimens were stripped from the molds, weighed, and the two weight values were averaged to obtain the specimen weight for that test condition.

TABLE 1

Mixture Proportions (lbs./cubic yard)

| Mix | 1 | 2 | 3 | 4 | 5 | 6 |
|---|---|---|---|---|---|---|
| Additive Dose (%) | 0 | 0.033 | 0.067 | 0 | 0.033 | 0.067 |
| Type I cement | 547 | 547 | 551 | 540 | 540 | 542 |
| Concrete Sand | 1693 | 1693 | 1703 | 1724 | 1724 | 1729 |
| ⅜" Pea Gravel | 1693 | 1693 | 1703 | — | — | — |
| ½" Limestone | — | — | — | 1724 | 1724 | 1729 |
| Water | 175 | 175 | 167 | 194 | 194 | 190 |
| W/C Ratio | 0.319 | 0.319 | 0.302 | 0.360 | 0.360 | 0.350 |
| Slump (in.) | 0 | 0 | 0 | 0 | 0 | 0 |

TABLE 2

Specimen Weight

| Mix | 1 | 2 | 3 | 4 | 5 | 6 |
|---|---|---|---|---|---|---|
| Additive Dose (%) | 0 | 0.033 | 0.067 | 0 | 0.033 | 0.067 |
| Avg. Cube Wt. (g) | | | | | | |
| 20 sec. | 1834 | 1819 | 2005 | 1849 | 2002 | 1957 |
| 60 sec. | 1884 | 1878 | 2007 | 1884 | 2090 | 2002 |
| 120 sec. | 1929 | 1922 | 2003 | 1906 | 2108 | 2035 |

Use of the additive in the range of 0.033 to 0.067% by weight of cement was found to significantly increase the degree of compaction. Specimens made with the pea gravel aggregate mixture, 0.067% additive, and a lower W/C ratio were found to be heavier at each vibration interval relative to the plain reference. Evidence of a lower total amount of energy needed to consolidate the mixture is demonstrated by the higher specimen weight at 20 seconds for the additive Mix 3 compared against the highest weight obtained for the plain Mix 1 at 120 seconds.

For specimens made with the limestone aggregate mixture, both the 0.033% additive at the same W/C ratio and the 0.067% additive at a lower W/C ratio were found to be heavier at each vibration interval relative to the plain reference. Evidence of a lower total amount of energy needed to consolidate the mixture, is demonstrated by the higher specimen weight at 20 seconds for the additive Mix 5 and Mix 6 compared against the highest weight obtained for the plain Mix 4 at 120 seconds.

EXAMPLE 2

An additive based on a derivatized polycarboxylate dispersant was evaluated in a dry cast concrete masonry block to determine the effects of the additive on specimen consolidation. Dosages of 0.020% and 0.027% by cement weight were compared against a reference mixture containing 1.0% by cement weight calcium stearate as a lubricant. A typical detergent based plasticizer for the block industry was included for comparison. Masonry block units were produced using a full scale production machine. In this application, the machine feed time and cycle time required to make one pallet of blocks are of importance in addition to the compressive strength of the units. Feed time refers to the time required to fill the hopper or fill drawer with material to be molded and it is adjusted to match the cycle time. Cycle time refers to the time to complete one full cycle of filling the hopper or drawer, filling the mold compressing the unit under pressure and vibration, and extracting the finished unit. Changes in cycle times of about 0.25 to 0.50 seconds are considered significant. The mixture proportions per batch were 190 lbs. cement and 1550 lbs. of block sand. The water content was established using the calcium stearate reference mixture, then held constant for the rest of the mixes. Mixture 11 represents a calcium stearate reference where the feed time was adjusted to match that of the additive mixes. Table 3 shows the feed time, cycle time and compressive strength results. Compressive strengths are net strengths, which means that they are based on the actual surface area of the block and not on the gross dimensions of block width and depth.

TABLE 3

| Mix | 7 | 8 | 9 | 10 | 11 |
|---|---|---|---|---|---|
| Dosage | Ca Stearate 1% by wt. | Detergent 4 fl. oz./cwt. | Additive 0.020% | Additive 0.027% | Ca Stearate 1% by wt. |
| Feed Time (sec.) | 1.6 | 1.6 | 1.0 | 1.0 | 1.0 |
| Cycle Time (sec.) | 9.87 | 9.53 | 9.01 | 8.81 | 8.80 |
| 1 Day Strength (psi) | 1330 | 1600 | 1520 | 1520 | 1255 |
| Block Weight (lbs.) | — | 37.03 | 34.42 | 35.05 | 34.13 |

Use of 0.02% additive reduced machine cycle times about 0.9 second relative to the calcium stearate reference and by about 0.5 seconds relative to the detergent based reference admixture. Cycle times for the 0.027% additive dosage were reduced about 1.1 seconds relative to the calcium stearate reference and by about 0.7 seconds relative to the detergent based reference admixture. Compressive strengths were found to be approximately the same for the detergent based reference (8) and the additive mixtures (9 & 10) even though the additive block weights were lower. Compressive strengths of the additive blocks (9 & 10) were significantly higher than the calcium stearate reference (7) and higher than the calcium stearate reference (11) where the feed time was adjusted to produce the same weight block as the additive.

EXAMPLE 3

An additive based on a derivatized polycarboxylate dispersant was evaluated in a dry cast concrete pipe to determine the effects of the additive on specimen consolidation, compressive strength and permeability. Concrete pipes were produced using two full scale production techniques and machines. One set of pipes was prepared using the dry cast process (Table 4), a second set of pipes was prepared using the packerhead process (Table 4a). In this application, the consolidation, surface appearance, permeability, and compressive strength of the finished pipe are of importance. Core samples were taken from the manufactured pipe in order to test compressive strength. Additional specimens for compressive strength and permeability testing were prepared using 4"×8" cylinders consolidated by intense vibration using a vibrating table. The mixture proportions per batch are shown in Tables 4 and 4a. Mixtures 14 in Table 4, and 18 in Table 4a include the addition of 8% by weight of cement uncompacted silica fume. Mixture 15 in Table 4 had 25% of the cement replaced with fly ash in addition to the 8% uncompacted silica fume. Mixture 19 in Table 4a had both 25% fly ash and 8% uncompacted silica fume as an addition. For mixtures in Table 4, the water content was set by the batchman based on his experience to achieve the desired dry cast consistency of zero slump, and was similar for all mixes except for Mixture 13 which had 10 gallons of water held out. For mixtures in Table 4a, the water content was set by the batchman for the reference then held constant for the rest of the mixes. All additive dosages are percent by weight of total cementitious material. Table 5 and 5a show the compressive strength and permeability results.

TABLE 4

Mixture Proportions (lbs. per batch)

| Mix | 12 | 13 | 14 | 15 |
|---|---|---|---|---|
| Additive Dose | 0 | 0.027 | 0.067 | 0.067 |
| Type I cement | 1600 | 1600 | 1600 | 1200 |
| Silica Fume | — | — | 128 | 128 |
| Fly Ash | — | — | — | 400 |
| Concrete Sand | 6000 | 6000 | 6000 | 6000 |
| Coarse Aggregate | 6000 | 6000 | 6000 | 6000 |

TABLE 4a

Mixture Proportions (lbs. per batch)

| Mix | 16 | 17 | 18 | 19 |
|---|---|---|---|---|
| Additive Dose (%) | 0 | 0.043 | 0.106 | 0.087 |
| Type I cement | 850 | 850 | 850 | 850 |
| Silica Fume | — | — | 68 | 68 |
| FlyAsh | — | — | — | 212 |
| Concrete Sand | 3000 | 3000 | 3000 | 3000 |
| Coarse Aggregate | 3000 | 3000 | 3000 | 3000 |

TABLE 5

| Mix | 12 | 13 | 14 | 15 |
|---|---|---|---|---|
| Additive Dose | 0 | 0.027 | 0.067 | 0.067 |
| Cylinder Comp. Strength (psi) | | | | |
| 7 day | 6160 | 6965 | 7130 | 7240 |
| 14 day | 7410 | 7960 | 7830 | 8730 |
| 28 day | 7960 | 8240 | 10140 | 10540 |
| Strength Improvement (@ 28 days) | | +3.5% | +27% | +32% |
| Core Comp. Strength (psi) | | | | |
| 90 day | 8210 | 8450 | 8900 | 10050 |
| Cylinder Permeability (Coulombs) | | | | |
| 90 day | 2841 | 2027 | 521 | 330 |

TABLE 5a

| Mix | 16 | 17 | 18 | 19 |
|---|---|---|---|---|
| Additive Dose (%) | 0 | 0.043 | 0.106 | 0.087 |
| Cylinder Comp. Strength (psi) | | | | |
| 7 day | 6530 | 6900 | 8370 | 6940 |
| 90 day | 8310 | 9660 | 10650 | 7950 |
| Cylinder Permeability (Coulombs) | | | | |
| 90 day | 1687 | 1558 | 439 | 231 |

All of the pipe produced by the dry cast process compacted well with no sagging or deformation observed for any of the pipe on demolding, which was immediately after casting. Cylinder compressive strengths for the additive Mixes 13–15 were higher than the reference Mix 12. The combination of uncompacted silica fume and additive or uncompacted silica fume, fly ash replacement, and additive produced the highest compressive strengths. All of the pipe produced by the Packerhead process compacted well with no sagging or deformation observed on demolding. Cylinder compressive strengths for the additive Mixes 17–19 were higher than the reference Mix 16. The combination of uncompacted silica fume and additive produced the highest compressive strengths. The very low coulomb values for the mixtures containing silica fume indicate that the silica fume is properly dispersed and that the mixture consolidated well despite the added fines.

EXAMPLE 4

The paste response to vibration of mixtures with different dispersants were tested. Each admixture was compared at the same W/C ratio. Each paste mixture comprised 650 g cement and 161 g water for a W/C ratio of 0.248. The following dispersants: A (a polyoxyalkylene derivatized methacrylate polymer); B (a polyoxyalkylene derivatized styrene maleic copolymer); and C (a hydroxyalkyl derivatized (meth)acrylate copolymer) were compared to calcium lignosulfonate. The levels were 0.049% by wt. for A, B, and C, and 0.188% by wt. for calcium lignosulfonate. The pastes were prepared using ASTM C-305 mixing procedure. All had putty-like consistency; however, the calcium lignosulfonate paste was noticeably wetter than the other mixtures.

The paste response to vibration was evaluated by measuring the spread of paste mass over time when subjected to vibration. The tests were conducted at 3500 and 7500 vibrations per minute using lab vibrating table (FMC Syntron Vibrating Table, Model VB5101). The results are listed below in Table 6 expressed as percent flow increase over the starting diameter of the mass.

TABLE 6

| | | 3500 VPM | | | | | 7500 VPM | | | |
|---|---|---|---|---|---|---|---|---|---|---|
| Mix | Time (sec.) | 10 | 20 | 30 | 40 | 60 | 10 | 20 | 30 | 40 |
| 20 | Plain | 37 | 45 | 52 | 56 | 60 | 83 | 97 | 105 | 109 |
| 21 | A | 51 | 60 | 65 | 69 | 70 | 100 | 111 | 116 | 120 |
| 22 | B | 43 | 47 | 53 | 55 | 58 | 94 | 108 | 116 | 119 |
| 23 | C | 56 | 65 | 71 | 74 | 83 | 102 | 124 | 132 | 136 |
| 24 | Calcium Ligno-sulfonate | 60 | 70 | 75 | 79 | 82 | 106 | 118 | 125 | 130 |

The above results show that pastes containing derivatized polycarboxylates A, B, and C demonstrated improved flow response compared to the plain reference where all of the mixtures had similar consistencies, and; that the flow response for pastes containing low levels of derivatized polycarboxylates A, B, and C were similar to the wetter mixture containing a higher level of calcium lignosulfonate.

The derivatized polycarboxylate dispersant used in the following examples was a commercially available monomethyl polyethylene glycol polymethacrylate ester.

Swipe effect was determined by visual observation and was ranked on a scale of 1 (no swipe) to 5 (heavy swipe). Compressive strength was measured by ASTM C1176-2.

EXAMPLE 7

Formulation 1 was a mixture of 56% by weight derivatized polycarboxylate dispersant and 44% by weight surface active agent/air entraining agent based on 50% by weight cocamide DEA and 50% by weight alpha olefin sulfonate.

Formulation 2 was a mixture of 76% by weight derivatized polycarboxylate dispersant and 24% by weight surface active agent/air entraining agent based on 50% by weight cocamide DEA and 50% by weight alpha olefin sulfonate.

Formulation 3 was a mixture of 36% by weight derivatized polycarboxylate dispersant and 64% by weight surface active agent/air entraining agent based on 50% by weight cocamide DEA and 50% by weight alpha olefin sulfonate.

Cementitious mixtures were prepared using the above swipe formulations in combination with a cement composition. The formulations were also compared to a plain mixture and a mixture containing only surface active agent/air entraining agent based on 50% cocamide DEA and 50% alpha olefin sulfonate. The materials in the mixture were 2.11 lbs. of Ashgrove Type 1 cement, 15.51 lbs. of fine aggregate comprising a blend of coarse and fine sands. The water amount for the mixtures was 1.27 pounds, which gave a W/C ratio of 0.6. The dosage amounts are listed in Table 7.

Cementitious mixtures were prepared by adding water to a mixer, adding the swipe formulation, adding stone, adding the cement, then adding the remaining materials. The mixtures were added to a mold and vibrated for 20 seconds. The size of the blocks formed in the mold was 4 inches by 4 inches by 8.5 inches. The swipe of each mixture is listed in Table 7.

TABLE 7

| Mix # | Admixture | Dosage % by weight of cement | Swipe Effect | Block Weight after 1 day cure at 90° F. (lb) |
|---|---|---|---|---|
| S1 | Plain | N/A | None | 10 |
| S2 | Air Ent. Agent | 0.03 | 5 | 8.9 |
| S3 | Formulation 3 | 0.03 | 4 | 9.65 |
| S4 | Formulation 1 | 0.03 | 3 | 9.85 |
| S5 | Formulation 2 | 0.03 | 3 | 9.80 |

The above results show that the formulation 1 to 3 not only provided the right amount of swipe effect, but also increased the density of the blocks.

EXAMPLE 8

Admixture 1 was 76% by weight derivatized polycarboxylate dispersant and 24% by weight surface active agent/air entraining agent based on 50% by weight cocamide DEA and 50% by weight alpha olefin sulfonate. Admixture 2 was 77% by weight derivatized polycarboxylate dispersant and 23% by weight surface active agent/air entraining agent based on ethoxylated nonylphenol.

Cementitious mixtures were prepared as above. The admixture and dosage were varied. The cementitious mixture was Ashgrove Type I cement 360 lbs./yd$^3$, 2643 lbs./yd$^3$ of fine aggregate comprising a blend of coarse and fine sands, 866 lbs./yd$^3$ pea gravel from Best Sand, Chardon, Ohio, 204 lbs./yd$^3$ water, with a W/C of 0.57. The swipe of each mixture was measured and the results are shown in Table 8.

TABLE 8

| Mix No. | Admixture | Dosage % by weight of cement | Swipe Effect |
|---|---|---|---|
| S6 | Plain | N/A | 1 |
| S7 | 1 | 0.06 | 5 |
| S8 | 1 | 0.035 | 4 |
| S9 | 1 | 0.030 | 5 |
| S10 | 1 | 0.012 | 1 |
| S11 | 1 | 0.012 | 1 |
| S12 | 2 | 0.012 | 1 |
| S13 | 2 | 0.024 | 3 |
| S14 | 2 | 0.030 | 4 |

The results in Table 8 show that the higher the dosage of the derivatized polycarboxylate dispersant/surface active agent/air entraining agent admixture the swipe is increased.

EXAMPLE 9

Mixtures were prepared as in Example 8 using the same admixture formulations. The dosage was varied to determine the effect on early compressive strength and compared to a dispersant only mixture. The prepared mixtures were cast into cylinders for testing. The results are listed below in Table 9.

TABLE 9

| Mix No. | Admixture | Dosage % by weight of cement | Compressive Strength (psi) |
|---|---|---|---|
| S15 | Plain | N/A | 1330 |
| S16 | 1 | 0.024 | 1520 |
| S17 | 1 | 0.030 | 1420 |
| 518 | 2 | 0.024 | 1610 |
| S19 | 2 | 0.030 | 1730 |
| S20 | 2 | 0.012 | 1480 |
| S21 | 1 | 0.012 | 1210 |
| S22 | Dispersant only | 0.030 | 1320 |

The results in Table 9 show that the combination of the dispersant with the surface active agent/air entraining agent increases the compressive strength as compared to a plain sample or a sample with the dispersant only. Generally, as the dosage of dispersant/surface active agent/air entraining agent increases, the compressive strength is also increased.

As demonstrated above, the present invention achieves the objects of the invention. The present invention therefore provides a dispersant with a lower effective dosage required to consolidate a cementitious dry cast mixture and provide a cementitious dry cast mixture article that has increased green strength and increased compressive strength. Additionally, the present invention also provides a combination of a derivatized polycarboxylate dispersant with a surface active agent/air entraining agent to increase the swipe and early compressive strength of a cementitious dry cast mixture.

Although the invention has been described in detail through the above detailed description and the preceeding examples, these examples are for the purpose of illustration only and it is understood that variations and modifications can be made by one skilled in the art without departing from the spirit and the scope of the invention.

What is claimed is:

1. A cementitious dry cast mixture comprising hydraulic cement, coarse aggregate, fine aggregate, and including a dispersant, wherein said dispersant is a derivatized polycarboxylate dispersant which is a polymer comprising units derived from at least a substituted carboxylic acid monomer or substituted ethylenically unsaturated monomer, and optionally including at least one of an unsaturated hydrocarbon, an N-polyoxyalkylene maleimide, and a condensation product of an unsubstituted carboxylic acid monomer and an alkoxypolyoxyalkylene primary amine substituted carboxylic acid monomer; wherein the dispersant has the general structure:

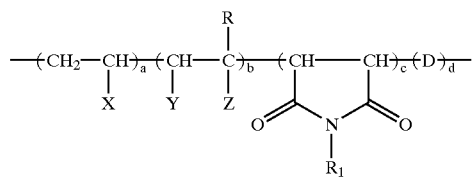

-continued

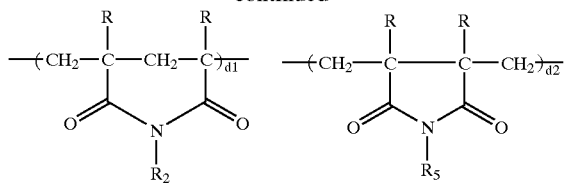

where
D=a component selected from the group consisting of the structure d1, the structure d2, and mixtures thereof;
X=H, $CH_3$, $C_2$ to $C_6$ Alkyl, Phenyl, Substituted Phenyl, Sulfonated Phenyl;
Y=H, —COOM;
R=H, $CH_3$;
Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;
$R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, about $C_6$ to about $C_{10}$ aryl;
M=H, Alkali Metal, Alkaline Earth Metal, Ammonia, Amine, Substituted Amine, Methyl, $C_2$ to about $C_6$ Alkyl;
a=0 to about 0.8;
b=about 0.2 to about 1.0;
c=0 to about 0.5;
d=0 to about 0.5; and wherein a, b, c, and d represent the mole fraction of each unit and the sum of a, b, c, and d is 1.0.

2. The cementitious dry cast mixture of claim 1, wherein the dispersant level is from about 0.005 to about 0.12% by weight of cement.

3. The cementitious dry cast mixture of claim 1, wherein the hydraulic cement is portland cement.

4. The cementitious dry cast mixture of claim 1 additionally containing a pozzolan.

5. The cementitious dry cast mixture of claim 4, wherein if present, the pozzolan is one of silica fume, a fly ash, calcined clay, and mixtures thereof.

6. The cementitious dry cast mixture of claim 4, wherein if present, the pozzolan is added in an amount from about 5% to about 30% based on the weight of cement.

7. The cementitious dry cast mixture of claim 1, wherein a is from 0 to about 0.6.

8. The cementitious dry cast mixture of claim 7, wherein a is from 0 to about 0.5.

9. The cementitious dry cast mixture of claim 1, wherein b is from about 0.3 to about 1.0.

10. The cementitious dry cast mixture of claim 9, wherein b is from about 0.4 to about 1.0.

11. The cementitious dry cast mixture of claim 1, wherein c is from 0 to about 0.3.

12. The cementitious dry cast mixture of claim 11, wherein c is from 0 to about 0.1.

13. The cementitious dry cast mixture of claim 1, wherein d is from 0 to about 0.3.

14. The cementitious dry cast mixture of claim 13, wherein d is from 0 to about 0.1.

15. The cementitious dry cast mixture of claim 1, wherein a is greater than 0 and c is 0 and d is zero.

16. A cementitious dry cast mixture comprising hydraulic cement, coarse aggregate, fine aggregate, a surface active agent/air entraining agent, and including a dispersant, wherein said dispersant is a derivatized polycarboxylate dispersant which is a polymer comprising units derived from at least a substituted carboxylic acid monomer or substituted ethylenically unsaturated monomer, and optionally including at least one of an unsaturated hydrocarbon, an N-polyoxyalkylene maleimide, and a condensation product of an unsubstituted carboxylic acid monomer and an alkoxy-polyoxyalkylene primary amine substituted carboxylic acid monomer; wherein the dispersant has the general structure:

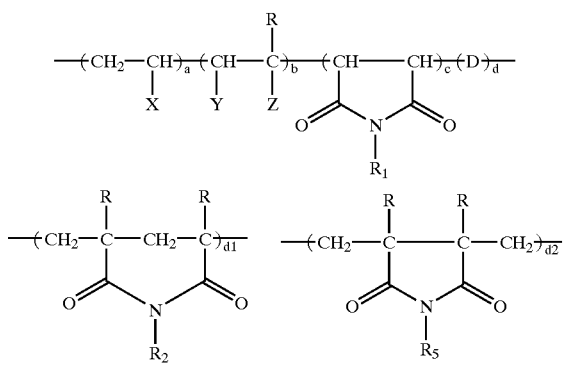

where

D=a component selected from the group consisting of the structure d1, the structure d2, and mixtures thereof;

X=H, $CH_3$, $C_2$ to $C_6$ Alkyl, Phenyl, Substituted Phenyl, Sulfonated Phenyl;

Y=H, —COOM;

R=H, $CH_3$;

Z=H, —$SO_3M$, —$PO_3M$, —COOM, —$OR_3$, —$COOR_3$, —$CH_2OR_3$, —$CONHR_3$, —$CONHC(CH_3)_2$ $CH_2SO_3M$, —$COO(CHR_4)_nOH$ where n=about 2 to about 6;

$R_1$, $R_2$, $R_3$, $R_5$ are each independently —$(CH_2CHRO)_mR_4$ random copolymer of oxyethylene units and oxypropylene units where m=about 10 to about 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, about $C_6$ to about $C_{10}$ aryl;

M=H, Alkali Metal, Alkaline Earth Metal, Ammonia, Amine, Substituted Amine, Methyl, $C_2$ to about $C_6$ Alkyl;

a=0 to about 0.8;

b=about 0.2 to about 1.0;

c=0 to about 0.5;

d=0 to about 0.5; and wherein a, b, c, and d represent the mole fraction of each unit and the sum of a, b, c, and d is 1.0.

17. The cementitious dry cast mixture of claim 16, wherein the dispersant level is from about 0.005 to about 0.12% by weight of cement.

18. The cementitious dry cast mixture of claim 16, wherein the hydraulic cement is portland cement.

19. The cementitious dry cast mixture of claim 16 additionally containing a pozzolan.

20. The cementitious dry cast mixture of claim 16, wherein the surface active agent/air entraining agent is selected from the group consisting of anionic surfactants, cationic surfactants, nonionic surfactants, natural resin, synthetic resin, natural rosin, synthetic rosin, any inorganic air entraining agent, and mixtures thereof.

21. The cementitious dry cast mixture of claim 20, wherein the surface active agent/air entraining agent is selected from the group consisting of alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, silicon containing surfactants, olefin sulfonates, olefin sulfates, and mixtures thereof.

22. The cementitious dry cast mixture of claim 21, wherein the surface active agent/air entraining agent is selected from the group consisting of ethoxylated nonylphenol, alpha olefin sulfonate, cocamide DEA, and mixtures thereof.

23. The cementitious dry cast mixture of claim 16 wherein the surface active agent/air entraining agent is present in an amount from about 0.001 to about 0.4% based on the weight of the cement.

24. The cementitious dry cast mixture of claim 16, wherein the surface active agent/air entraining agent is present in an amount from about 0.005 to about 0.12% based on the weight of the cement.

25. The cementitious dry cast mixture of claim 16, wherein the weight ratio of the derivatized polycarboxylate dispersant to the surface active agent/air entraining agent is from about 10:1 to about 1:10.

26. The cementitious dry cast mixture of claim 25, wherein the weight ratio of the derivatized polycarboxylate dispersant to the surface active agent/air entraining agent is from about 6:4 to about 4:6.

27. The cementitious dry cast mixture of claim 1, wherein at least one of the following is present in the dispersant:

a) M comprises triethanol amine; and b) X comprises p-Methyl Phenyl.

28. The cementitious dry cast mixture of claim 16, wherein at least one of the following is present in the dispersant:

a) M comprises triethanol amine; and b) X comprises p-Methyl Phenyl.

* * * * *